July 2, 1963  YUKIO TANAKA  3,096,221
METHOD OF QUICK NITRIFICATION IN WHICH
FLUIDIZED PARTICLES ARE EMPLOYED
Filed Jan. 4, 1960
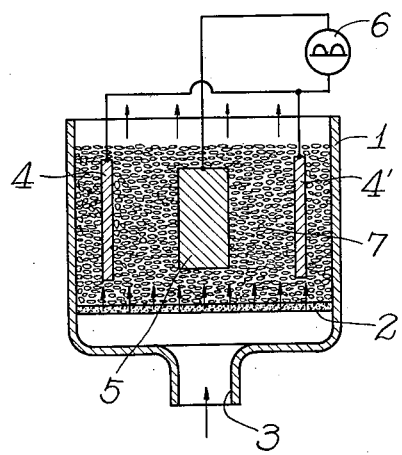
INVENTOR
*Yukio Tanaka,*
BY *Pierce, Scheffler & Parker*
*his* ATTORNEYS United States Patent Office 3,096,221
Patented July 2, 1963

3,096,221
METHOD OF QUICK NITRIFICATION IN WHICH FLUIDIZED PARTICLES ARE EMPLOYED
Yukio Tanaka, Tokyo, Japan, assignor to To-a Kako Kabushiki Kaisha, Tokyo, Japan, a corporation of Japan
Filed Jan. 4, 1960, Ser. No. 317
Claims priority, application Japan Sept. 15, 1959
4 Claims. (Cl. 148—20.3)

This invention relates to an improvement of a nitrifying method.

In forming a nitrified layer on the surface of a steel, there has conventionally been adopted a method wherein, after the steel is quenched and annealed, it is kept at a high temperature in an ammonia gas current for a long time so that its surface may be nitrified. However, said conventional method is accompanied with defects that a treatment for a long time must be carried out in the nitrification and that the operation of the nitrifying furnace is difficult.

A principal object of the present invention is to provide a method of nitrifying wherein the operation of nitrifying can be accomplished within a short time.

A further object of the present invention is to provide a method of nitrifying wherein the nitrifying operation is easy.

Another object of the present invention is to provide a method of nitrifying wherein the cost required to build the nitrifying apparatus is low.

According to the present invention, there is provided a method of quick nitrification in which fluidized particles are employed, characterized in that a nitrifying agent in the form of fine particles is fluidized, electrodes and a steel to be nitrified are dipped in the layer of said nitrifying agent in the fluid state and an electric pressure is impressed between said electrodes and steel with the electrodes in a positive potential to the steel so that a spark discharge may be caused on the surface of the steel to be nitrified.

The bed of fine particles of nitrifying agent in a fluid state as in the above description can be obtained, for example, by a process wherein, when a bottom wall made of such material which will pass gases but no fine particles of a nitrifying agent as a porous tile is set in the middle of a chamber, the fine particles are contained above this bottom wall and a gas under pressure is forced in through an inlet made in the bottom of the chamber, the fine particles will be blown up by the gas so as to float. Such state is called fluidization herein. The preferable size of the fine particle of a nitrifying agent is 100 to 150 meshes per inch. The gas to be used to fluidize the fine particles is nitrogen gas or ammonia gas. The pressure of the gas is different depending on the capacity of the chamber and the thickness and porosity of the bottom wall but is preferably about 4 to 10 kg./cm.² The electric current to be used is a pulsating current. By the expression "pulsating current" is meant an electric current which is flowed repeatedly, at regular intervals, in one direction.

The accompanying drawing illustrates an embodiment of the apparatus for working the method of quick nitrification by employing fluidized particles according to the present invention.

The present invention shall be explained with reference to the drawing.

In the drawing, 1 is a fluidizing chamber and 2 is a porous bottom wall made of such porous material as, for example, a porous tile and installed in the intermediate bottom of said fluidizing chamber. Said porous bottom wall is made of such material as will pass gases but will not pass any nitrifying agent in the form of fine particles. 3 is a gas feeding inlet made in the bottom of the fluidizing chamber. 4 and 4' are electrodes arranged as opposed to each other in the fluidizing chamber. 5 is a steel to be nitrified as inserted between the electrodes. 6 is an electric source for generating a pulsating current to be passed through the electrodes 4 and 4' and the steel 5 to be nitrified. The electric source is so connected that the electrodes 4 and 4' may be of a positive potential to the steel to be nitrified. 7 is a nitrifying agent in the form of fine particles as fluidized.

The operation of the method of the present invention shall be explained in the following. When such nitrifying agent as, for example, barium cyanide $Ba(CN)_2$ in the form of fine particles is sprinkled on the porous bottom wall 2 within the fluidizing chamber 1 and nitrogen or ammonia gas is fed in through the gas feeding inlet 3 made in the bottom of the fluidizing chamber, said gas will pass through the porous bottom wall 3 and will blow up the nitrifying agent in the form of fine particles so that the fine particles of the nitrifying agent may be in a floating state. This is fluidization so called herein. The electrodes 4 and 4' and the steel 5 to be nitrified will then be dipped in the layer of the thus fluidized fine particles of the nitrifying agent. In such state, if a pulsating current from the electric source 6 is impressed between the electrodes 4 and 4' and the steel 5, the current will flow through the electrodes and the steel to be nitrified, a spark discharge will be caused on the whole surface of the steel and the temperature of the surface of said steel to be nitrified will rise. Further, by the spark discharge caused on the surface of the steel, the nitrifying agent will be decomposed and atomic nitrogen will be produced and ionized. Then, as the electrodes 4 and 4' are in a positive potential to the steel 5 to be nitrified, the ionized atomic nitrogen will be accelerated by the electric field caused between the electrodes so as to penetrate the steel.

According to experiments made by the inventor, the internal dimensions of the fluidizing chamber were 160 mm. x 300 mm. x 150 mm. The thickness of the porous tile was about 30 mm. The nitrifying agent was barium cyanide $Ba(CN)_2$ of 60 meshes per inch. Nitrogen gas was blown in under a pressure of about 4 kg./cm.² through the gas feeding inlet made in the bottom of the fluidizing chamber. The surface area of each electrode was of 200 mm. x 150 mm. The distance between the electrodes was 100 mm. A round steel 90 mm. in diameter and 100 mm. long was disposed between said electrodes. The electric source was one for generating a pulsating current of 1 kilo volt at the peak at 100 cycles. A current of an average of 15 ampere per cm.² of the surface area of the steel to be nitrified could be passed. A nitrified layer of 0.7 mm. in the steel could be thereby obtained per hour.

As evident from the above explanation, according to the present invention, the nitrifying agent in the form of fine particles as fluidized will be decomposed by the spark discharge caused on the surface of the steel to be nitrified and the nitrogen gas produced by said decomposition will be accelerated by the electric field so as to penetrate the steel. Therefore, the nitrifying velocity is very high.

What is claimed is:

1. A method for the quick nitrification of a steel piece which comprises establishing and maintaining a fluidized bed of finely divided particles of a solid nitrifying agent suspended in a gas selected from the group consisting of nitrogen and ammonia, immersing the steel piece in said fluidized bed between electrodes likewise immersed in said bed, and passing pulsating electric current through the particles from said electrodes to said steel piece under such conditions that the particles are at a positive potential and the steel piece is at a negative potential whereby spark discharges are generated on the surface of the steel piece, atomic nitrogen is produced by decomposing nitriding agent at the surface and is ionized, and the ionized atomic nitrogen penetrates the surface of the steel piece.

2. A method of quick nitrification according to claim 1 wherein said nitrifying agent is barium cyanide $Ba(CN)_2$.

3. A method of quick nitrification according to claim 1 wherein a gas to fluidize fine particles of nitrifying agent is nitrogen gas.

4. A method of quick nitrification according to claim 1 wherein a gas to fluidize fine particles of nitrifying agent is ammonia gas.

References Cited in the file of this patent

UNITED STATES PATENTS

| | | |
|---|---|---|
| 799,542 | Davis | Sept. 12, 1905 |
| 876,862 | Davis | Jan. 14, 1909 |
| 1,929,392 | Malcolm | Oct. 3, 1933 |
| 2,596,981 | Chenault et al. | May 20, 1952 |
| 2,670,573 | Sullivan | Mar. 2, 1954 |
| 2,927,231 | Bucek | Mar. 1, 1960 |
| 3,053,704 | Munday | Sept. 11, 1962 |

FOREIGN PATENTS

| | | |
|---|---|---|
| 732,101 | Great Britain | June 22, 1955 |

OTHER REFERENCES

Physical Review, vol. 55, April 15, 1939, pages 769–775.